(12) United States Patent
Harmon

(10) Patent No.: US 7,278,090 B2
(45) Date of Patent: Oct. 2, 2007

(54) CORRECTION PARAMETER DETERMINATION SYSTEM

(75) Inventor: Tim Harmon, Gilbert, AZ (US)

(73) Assignee: NXP B.V., Eindhoven (NL)

( * ) Notice: Subject to any disclaimer, the term of this patent is extended or adjusted under 35 U.S.C. 154(b) by 617 days.

(21) Appl. No.: 10/816,335

(22) Filed: Mar. 31, 2004

(65) Prior Publication Data

US 2005/0240836 A1    Oct. 27, 2005

(51) Int. Cl.
*G06F 11/00* (2006.01)

(52) U.S. Cl. ............ 714/808; 714/781; 714/757; 714/805; 708/491; 708/492

(58) Field of Classification Search ......... 714/808, 714/52, 781, 754, 757, 791, 805; 708/491, 708/492
See application file for complete search history.

(56) References Cited

U.S. PATENT DOCUMENTS

| | | | | |
|---|---|---|---|---|
| 5,751,620 A | * | 5/1998 | Monier | 708/492 |
| 5,777,916 A | * | 7/1998 | Monier | 708/530 |
| 5,793,659 A | * | 8/1998 | Chen et al. | 708/491 |
| 5,912,904 A | * | 6/1999 | Monier | 714/781 |
| 6,230,178 B1 | * | 5/2001 | Pomet | 708/491 |
| 6,356,636 B1 | * | 3/2002 | Foster et al. | 380/30 |
| 6,415,310 B1 | * | 7/2002 | Takenaka et al. | 708/491 |

* cited by examiner

*Primary Examiner*—Guy Lamarre
*Assistant Examiner*—Fritz Alphonse
(74) *Attorney, Agent, or Firm*—Peter Zawilski

(57) ABSTRACT

An circuit arrangement and method for reducing the number of processing loops needed to generate an error correction parameter used in the Montgomery method. An initial input to a processing loop is set to a value equal to the modulus, left shifted one register position. Values of the working register are shifted multiple positions during a single loop iteration, and a shifted result is subtracted and compared to zero to determine subsequent contents of the working register.

31 Claims, 3 Drawing Sheets

CORRECTION PARAMETER DETERMINATION SYSTEM

FIELD OF THE INVENTION

The invention is generally related to circuits and systems for performing modular exponentiations of large numbers, and more particularly, to circuits and systems for production of an error correction parameter associated with Montgomery modular multiplication.

BACKGROUND ART

The demand for secure information continues to drive improvements relating to cryptology. Modular exponentiation, and more particularly, the Montgomery algorithms, remains fundamental to the encryption and decryption of confidential, authenticated data used in Internet and electronic commerce. Montgomery modulation generally exploits properties and interrelations of very large numbers to avoid working with the numbers, themselves. Accordingly, dedicated programming and hardware for implementing Montgomery processes have been developed to achieve the repeated multiplications required for modular exponentiation in a faster and more efficient manner.

Calculation of an error correction parameter associated with Montgomery modulation is vital to the performance of exponentiation hardware and software. The error correction parameter is a constant that equals $2^{2n}$ mod N, where n is equivalent to the number of bits in the modulus, N, rounded up to the nearest multiple of the size of the multiplier core used in Montgomery modulation. As such, the parameter equals the remainder of a normal division operation where a bit string with a most significant bit of one, followed by 2n least significant zeros, is divided by the modulus.

In certain implementations, the error calculation parameter is pre-calculated using software configured to run the above described modulo operation on a computer with adequate processing. However, the size of the modulus, N, which can be on the order of thousands of bits in length, can burden even large processors. Alternatively, hardware circuit implementations that use dedicated gates to avoid the long delays of software are subject to their own timing issues. For instance, conventional hardware circuits must perform $2^{2n}$ processing loops during a modulo operation to arrive at the error correction parameter. Each iteration of the loop consists of a shift/compare operation, where a (n+1) bit accumulator is compared to the modulus, with the modulus subtracted therefrom if it is greater, or the accumulator multiplied by two (e.g. by shifting the contents of the accumulator one bit to the left) if it is less.

Moreover, to reduce the size of the subtraction circuitry, often each subtraction operation is performed using a series of partial subtraction operations that operate on a few bytes at a time (e.g., performing a 1024 bit subtraction using 64-bit subtraction circuitry that performs 16 partial subtraction operations). The tradeoff for the reduced size of subtraction circuitry is that each loop iteration requires multiple clock cycles to handle each subtraction operation.

For instance, a first iteration of a conventional loop may consist of initially setting a value in a working register to one, left shifting by one position, and attempting to subtract the modulus from the left-shifted result to determine if the value of the working register is larger than the modulus. Where so, the subtracted value in the working register is retained. Otherwise, the subtracted value of the working register is discarded, and the pre-subtracted value is again shifted and compared to the modulus in a subsequent iteration of the loop. A total of 2n iterations are performed in this manner, with the resulting value in the working register being the desired error correction parameter. Given that the value of 2n can be in the thousands, it will be appreciated that such repetitious iterations represent some of the most time intensive operations of a Montgomery application.

Consequently and despite the advances in implementing modular multiplications, a continuing need exists for further improvements in the field to reduce the overhead associated with performing modular multiplication operations.

SUMMARY OF THE INVENTION

The invention addresses these and other problems associated with the prior art by in one aspect providing a circuit arrangement and method that performs a plurality of shift/compare operations on a working register that has an initial value greater than a modulus value. For instance, the initial input may be selected to be the smallest exponent of 2 that is greater than the modulus (i.e., in binary, a binary "1" value left shifted to one position past the most significant bit of the modulus). Such an initial setting can reduce the number of required loop iterations and accelerate the parameter's determination.

Moreover, consistent with another aspect of the invention, the working register may be shifted by more than one position in connection with a shift/compare operation in order to further reduce loop iterations. Further processing accelerations realized by the present invention include conducting subtraction and shifting operations in parallel. During each shift/compare operation, or loop iteration, the modulus value may be subtracted from the working register to yield a subtracted result, while the result of a shifting operation is conducted and stored separately from the subtracted result. As such, either of the two stored results may serve readily as input to the next iteration of the loop, following a comparison, without the delays that plague conventional processing.

In so doing, the concepts of the present invention individually and conjunctively reduce processing times associated with error correction parameter determination, while further reducing costs associated with purchase and assembly of logic gates and other hardware.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED EMBODIMENTS

Figure 1:
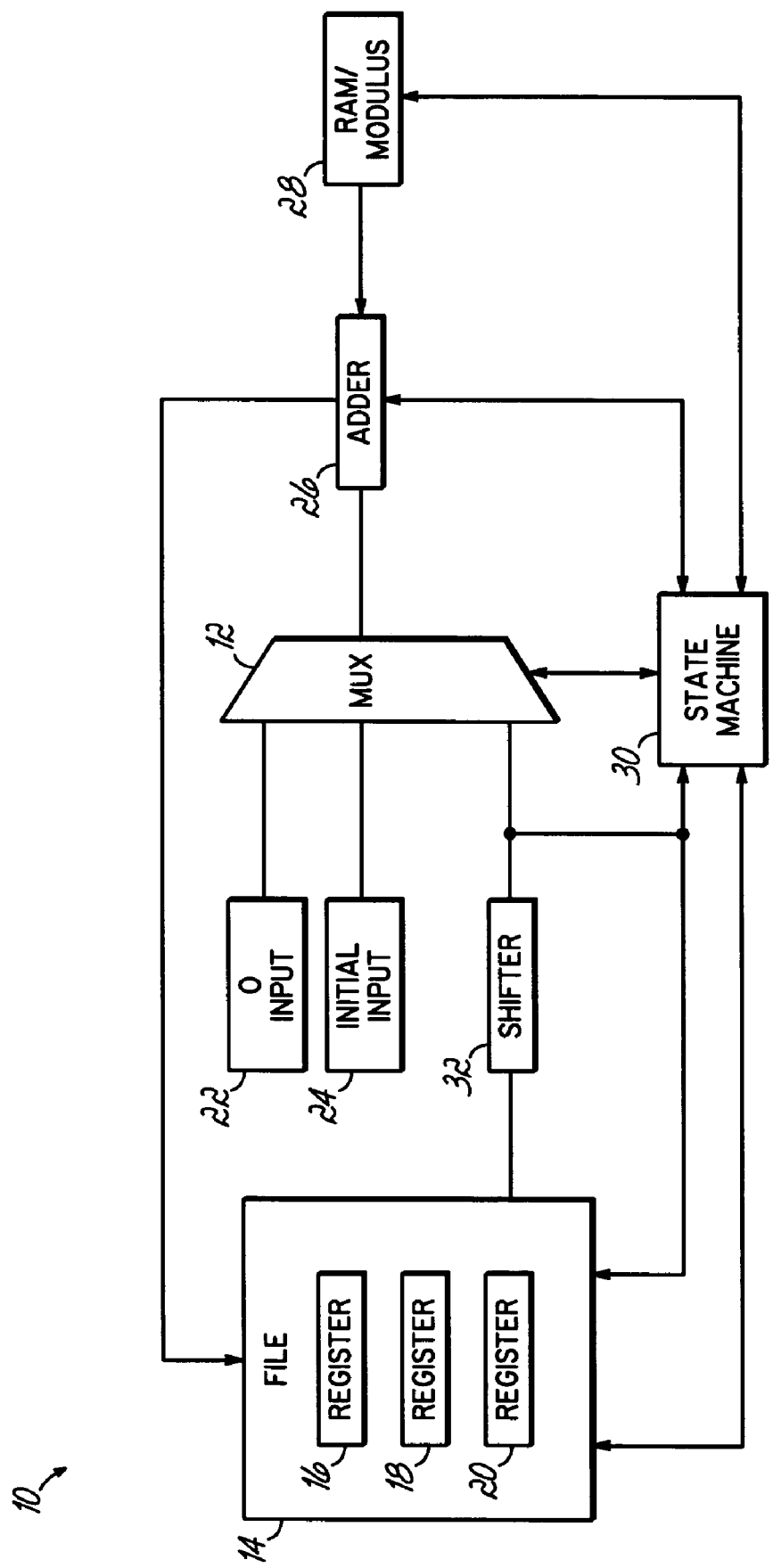
FIG. 1 is a block diagram of an error calculation circuit consistent with the invention.

Error correction determination for Montgomery modulation that is consistent with the invention may incorporate one or all of three concepts that provide substantial advantages over conventional parameter calculation techniques. The first concept applies to initializing an initial value for processing in a shift/compare operation, or loop iteration of an error correction circuit. This contrasts with conventional parameter calculation operations that shift the working register from a small initial value, e.g. "1," which typically requires approximately n iterations of a loop to be performed before the modulus is ever subtracted from a working value.

As an example, consider an exemplary operation where the modulus is a number with a most significant bit of 945. A conventional operation, beginning with "1" and shifting/comparing by one register place for each iteration, would require 945 loop iterations before the working register has a most significant bit that is greater than 945 and thus a value that will result in a positive value being returned by a subtraction operation. For each iteration prior to that which results in a positive value being returned, the subtraction result will be negative, and thus discarded. Thus, it has been found that many of the initial shift operations in a conventional algorithm are essentially unnecessary in that the results of these operations are already known.

According to the first concept of the present invention, the initial value of a working register may be set to a value approximately equal to the most significant bit of the modulus, shifted one position to the left. In so doing, processes of the present invention recognize that no subtraction is typically necessary until the value of the working register has been shifted to a point that it is comparable to that of the modulus. Where desired, the initial value may be determined as the modulus is being loaded. Such initialization may nearly halve processing loop requirements of the comparable applications that begin with a minimal initial input.

The second concept consistent with the invention also reduces loop iterations by shifting the contents of the working register multiple positions within a single loop iteration. This concept facilitates error parameter calculation when compared to conventional shifting functions that shift in singular register increments, i.e., one register position per loop iteration, and require multiple processing loops to arrive at a useful register value. For example, as a result of a previous shift/compare operation the position of the most significant bit of a word of the modulus may occupy a register position that is four relative register positions greater than the register position occupied by the most significant bit of a corresponding word of the working register. As such, a conventional operation will require four, single shifts and respective loop iterations prior to arriving at a value in the working register that is greater than the modulus, contrasting an embodiment of the present invention in which the four individual shifts may be replaced by a single, four-position shift.

Still greater efficiency may be achieved by a third concept consistent with the invention that allows a subtracted result to be shifted and compared to the modulus at substantially the same time. This feature differs from conventional shifting operations, which are accomplished during a separate step than the modular comparison. These separate, deliberate steps of conventional practices translate into wasted processing cycles.

Each of these concepts will be described in greater detail in connection with a description of processes comprising each feature. Prior to discussing these specific embodiments, however, an exemplary hardware and software environment is described in greater detail below. More particularly, FIG. 1 shows an exemplary parameter determination circuit 10 in accordance with the principles of the present invention. The circuit 10 includes a multiplexer 12 having multiple inputs from a register file 14, as well as a zero and an initial input 22, 24, respectively. An exemplary multiplexer 12 consistent with the invention may comprise any device configured to selectively output a designated input.

As shown in FIG. 1, the register file 14 includes three logical files, or registers 16-20. An exemplary register file 14 may include any digital storage or other memory. The size of each register 16-20 may be predetermined according to specific application requirements. For instance, each register 16-20 may accommodate 16, 64 bit values (i.e. 1024 bits). For purposes of this specification, "register" is used synonymously with the contained bit values or contents of an associated register. While having three registers 16-20 as shown in FIG. 1 may present certain advantages in one scenario, one of skill in the art will recognize that more or fewer registers could be used in accordance with the principles of the present invention. Moreover, programmable and other types of memory storage may alternatively or additionally be utilized.

In operation, the multiplexer 12 routes one of the inputs 14-24 to an adder 26, which also receives input from a memory 28. As with the zero and initial inputs 22, 24, memory 18 may comprise hard or programmable storage, as well as a signal containing binary data elements. For instance, suitable memory 18 may comprise random access memory (RAM) containing the 16, 64 bit words that define a 1024 bit modulus. As discussed in greater detail below, the adder 26 may include a device configured to subtract the contents of the memory 18 from the multiplexer output. For instance, the adder 26 of the embodiment shown in FIG. 1 accomplishes binary, bit-by-bit subtraction by adding one plus the inverse of the modulus to the multiplexer output.

A state machine 30 may couple to the multiplexer 12 and send instructions as to which input to send to the adder 26. An exemplary state machine 30 may dictate and maintain register and other hardware addresses, as well as clock counts. A suitable state machine 30 may include and/or comprise one or more controllers, and one of skill in the art will appreciate that the placement and configuration of the state machine 30 may vary per application in accordance with the principles of the present invention. The state machine 30 typically also communicates with the register file 14, adder 26 and memory 28, as well as with a variable shifter 32. Certain embodiments consistent with the invention include a variable shifter 32 configured to shift a register 16-18 output a plurality of bits in a single shift operation.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention. For example, while no clocking controls are shown in FIG. 1, it will be appreciated by one of skill in the art that clocks may be supplied by the state machine 30 whenever data must either emanate from or be fed into any of the above mentioned serially loaded/unloaded registers 16-20. One of skill in the art will further appreciate that while other controls are also unspecified, i.e., multiplexer addresses, latch transfer signals, etc., they may readily be implemented in accordance with the principles of the present invention.

Figure 2:
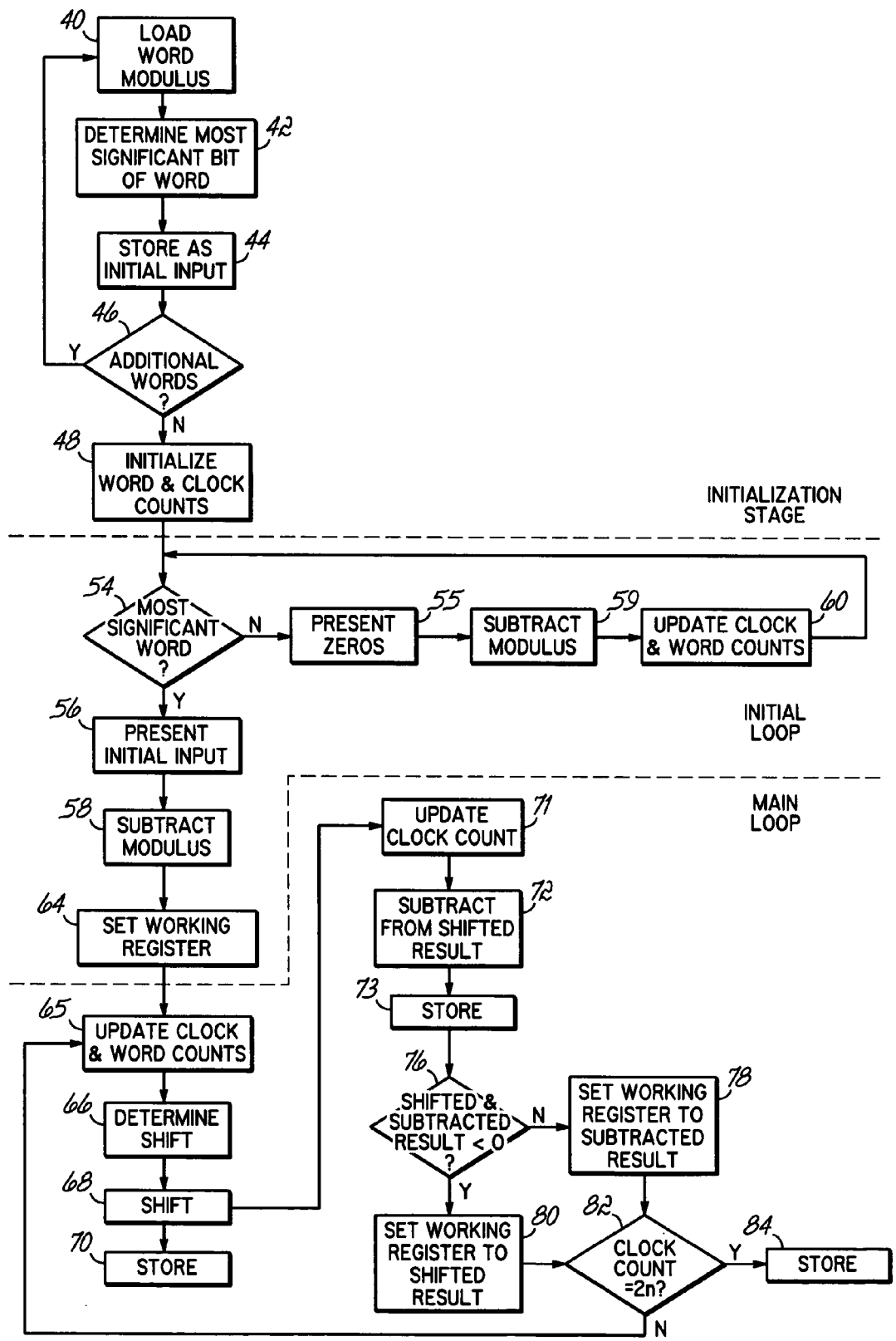
FIG. 2 is a flowchart of exemplary process steps suited to determine an initial input used in a processing loop executed by the hardware of FIG. 1.

FIG. 2 is a flowchart of exemplary process steps suited to determine the initial input 24 used in a processing loop executed by the hardware of FIG. 1. The flowchart of FIG. 2 further outlines sequenced steps consistent with describing processes that apply to the aforementioned processing loops, and ultimately, determination of the error correction parameter.

More particularly, the circuit 10 of FIG. 1 may load the modulus at block 40 of FIG. 2 as part of an initialization process that includes blocks 40-48. For instance, the modulus may be loaded into memory 18. The modulus value, N, is typically large and advantageously broken into a sequence of words of predetermined length. Continuing with the example discussed in conjunction with FIG. 1 for illustrative purposes, an exemplary modulus, or modulus value (as is herein used interchangeably with modulus), comprises 16 words of 64 bits each.

The state machine 30 operates on the modulus at block 42 as it is written to determine the most significant bit (and word) of the modulus. The most significant word of the modulus is the word containing its most significant bit. In operation, the state machine 30 may determine and store a most significant bit for a first loaded word at blocks 42 and 44. If the words of the modulus are loaded from least to most significant, the most significant word of the modulus will be the last word having an "on" data element. Thus, the state machine 30 repeats the determination processes of blocks 42 and 44, replacing the stored bit of block 44 with the most significant bit of a subsequently loaded word until no additional words at block 46 remain to be loaded. As is discussed below, zero inputs will be presented to the adder 26 at the occurrence of each word count that precedes the word count coinciding with the most significant word of the modulus as determined at blocks 42 and 44.

According to one embodiment that is consistent with the principles of the present invention, program code or dedicated logic circuitry associated with the state machine 30 and/or circuit 10 at block 44 of FIG. 2 stores the data as the initial input 24 of FIG. 1. Initial input 24 may comprise a signal conveying binary data information. The initial input 24 is typically the same size as a word of the modulus and corresponds to an integer greater than zero. More particularly, the circuit 10 may generate the initial input 24 by setting the bit of the initial input 24 to a value corresponding to the most significant bit of the most significant word of the modulus as determined at block 42, shifted once to the left. A left shift functions to multiply the integer value of the modulus by two. Accordingly, the value of the initial input may be updated as the modulus loads, until the final word of the modulus has been loaded at block 46.

The initialization processes at block 48 may include initialization of clock and word counts at the state machine 30. For example, the clock count may set to an increment between zero and n. As discussed herein, the state machine 30 may set and update the respective counts at blocks 60, 65 and 71 to determine, for instance, whether additional processing loops are necessary at block 82, and whether the most significant word of the modulus is presented at the adder 26 at block 54. While such a configuration lends particular advantages to certain embodiments of the present invention, one of skill in the art will recognize that the word and clock counts may alternatively or additionally be modified at other points in a processing loop per application requirements. Moreover, other positive settings of the initial value additionally accord with the principles of the present invention. Of note, "initial input" and "initial value" are used interchangeably throughout the specification.

Subsequent to establishing the initial input and clock settings at blocks 40-48, the system may perform an initial loop at blocks 54-64. The initial loop 54-64 may include determining at block 54 if the word count corresponds to the most significant word of the modulus as determined at block 42. Where such a condition does not exist, a zero input may be presented to the adder 26 at block 55. The circuit 10 shown in the embodiment of FIG. 2 may still subtract an appropriate word of the modulus at block 59 as determined by the word count.

Thus, for each word of the modulus that precedes (i.e., is less significant, if words are loaded from least to most significant) the most significant word of the modulus as determined at block 54, the multiplexer 12 presents a zero input 22 to the adder 26. For instance, if the eighth word of the modulus contains its most significant bit, then the circuit 10 will provide seven zero inputs to the adder 26 at block 55 coinciding with the arrival of the seven words of the modulus, inverted, that precede the word of the working register containing the most significant bit. Because binary subtraction is equivalent to adding the inverse of a value plus one, the carry-in of the adder 26 is set for the least significant word addition so it may add an additional one. As shown in FIG. 2, the clock and word counts may be updated at block 60 to reflect the subtraction(s) of the initial loop.

The state machine 30 may instruct the multiplexer 12 at block 56 to output the initial input 24 to the adder 26. The adder 26 of the embodiment of FIG. 1 adds the inverse of the most significant word of the modulus, plus the carry out of the previous addition operation, to the initial input 24 at block 58. This process effectively subtracts the modulus from a number consisting of the initial input 24, followed by all zeros.

Upon ensuring (via the word count) that each word of the modulus and initial value have been processed, the state machine 30 knows that the initial result output from the adder 26 must be positive, and initiates storage of the initial result at block 64. For instance, logic executed by the state machine 30 may cause the subtracted value to be stored in a register 18. For reasons that will become apparent after a complete reading of the specification, the state machine 30 may designate the address of the register 18 as being the working register. In (main) processing loops subsequent to the initial loop of blocks 54-64, the working register may selectively hold a shifted or another subtracted result. The clock and word counts may be incremented at block 65 to reflect the subtract/compare operation of the initial loop.

The contents of the working register 18 may be input to the variable shifter 32. In some embodiments, the state machine 30 may determine at block 66 how many positions the working register 18 will be shifted in the span of a single loop. As discussed in greater detail below, the variable shifter 32 may selectively shift the initial result by multiple bit positions in a single shift. For instance, the variable shifter 32 may shift the initial result to the left a number of places correlated to the difference between the most significant bit of the working register and the most significant bit of the modulus. Put another way, the number of places shifted may be determined by the number of leading zeros that occupy binary placeholders of less value than the most significant bit of the modulus.

As such, if the $32^{nd}$ bit of the eighth word of the modulus is most significant, the variable shifter 32 may left shift the working register at block 68 up to 32 places in one loop iteration. In operation, if the most significant bit of the eighth word of the working register is the $27^{th}$ bit, then the variable shifter 32 may left shift the subtracted result five places in a single loop iteration. Shifting en masse further reduces loop requirements by avoiding loop iterations where no subtraction will occur. However, it should be appreciated by one of skill in the art that it may be desirable to shift the working register only once under certain conditions. In any case, the state machine 30 may initiate storage of this shifted result at block 70 in a second register 16. The state machine 30 may additionally increment the clock count by five at block 71 to reflect the variable shift operation.

As per instructions from the state machine 30, the multiplexer 12 outputs the subtracted result from variable shifter 32 and block 68 to the adder 26. As such, the appropriate word of the modulus is subtracted from the shifted result at block 72. In one embodiment consistent with the invention, such action may comprise a single shift/compare operation. That is, each shift/compare operation may include a register shift, effectively multiplying the register contents by two, as well as a comparison to determine whether the word of the working register is larger than a corresponding word of the modulus. In Montgomery calculations, such shift/compare operations are accomplished in every loop iteration of the calculation.

The subtracted result may be subsequently stored at block 73. More particularly, the subtracted result may be stored in a third register 20 selected by the state machine 30. The tandem storage of the subtracted and shifted results in separate registers 16, 20 streamlines processing subsequent to the comparison at block 76.

As such, the subtracted result is compared to a reference value at block 76. For instance, the comparison at block 76 may determine whether the subtracted result is negative. Depending on the outcome of the determination, either the subtracted result or the shifted result will be used as the working register as designated by the state machine 30. More particularly, if the subtracted result is determined to be negative at block 76, then the state machine 30 may designate the register 20 containing the shifted value as the new working register. Alternatively, should the subtracted result be positive, then the register 16 containing the subtracted result becomes the new working register.

Assuming the clock count is not already equal to 2n at block 82, the contents of the working register (working value) is input into the variable shifter 32 at block 80, completing another processing loop. Should the clock count alternatively equal 2n at block 82 as required for the Montgomery method, then the binary data elements of the working register are output and stored as the error correction parameter at block 84.

Figure 3:
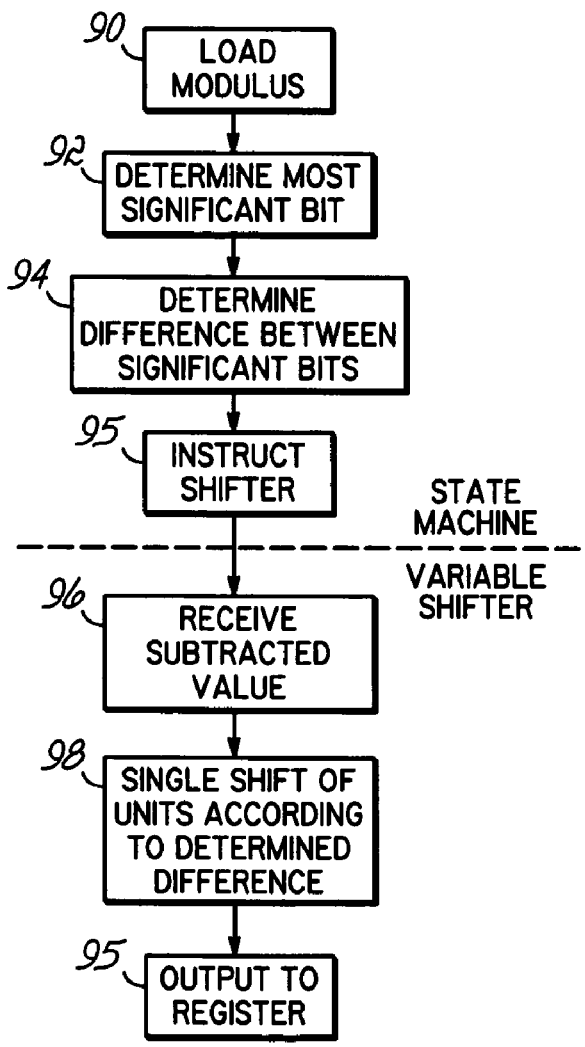
FIG. 3 is a flowchart of exemplary process steps suited to variably shift a binary word used in a processing loop executed by the hardware of FIG. 1.
Figure 4:
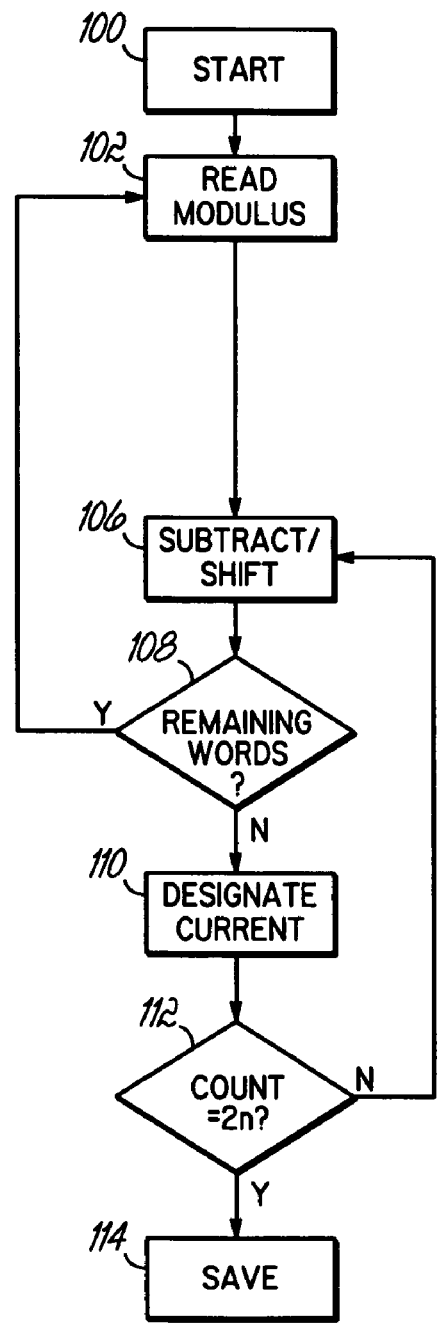
FIG. 4 is a flowchart illustrating the program flow of a state machine consistent with the invention.

While the exemplary steps shown in FIG. 2 are particularly advantageous under certain conditions, one of skill in the art will recognize that the sequence of these steps, as with all of the steps of the flowcharts of FIGS. 2-4, may be altered, with steps added or deleted in accordance with the principles of the present invention.

FIG. 3 is a flowchart having exemplary process steps suited to variably shift a binary word used in a processing loop as discussed briefly in the text describing blocks 66 and 68 of FIG. 2. The flowchart of FIG. 3 further illustrates typical interactions between the state machine 30 and the variable shifter 32. For example, the flowchart illustrates the state machine's 30 monitoring of the modulus loading at block 90. The state machine 30 reads the modulus to determine its most significant bit and word at block 92, as well as the corresponding most significant bit of the initial input or working value, as discussed above.

The state machine 30 further determines a number correlated to the difference between the most significant bits of the working register and the modulus at block 94, i.e., the number of consecutive leading zeros of the working register that are less than the most significant bit of the modulus. Referencing the ongoing example, the $32^{nd}$ bit is the most significant bit of the modulus' most significant word. Assuming that the most significant bit of the current value in the working register is $27^{th}$ bit, then the variable shifter 32 may shift the working register five units, or the difference between 32 and 27, in the next loop. As such, the state machine 30 may store this data and/or send an instruction to the variable shifter 32 at block 95 that relates to the data. For instance, the variable shifter 32 may receive an instruction at block 96 commanding it to shift its contents 5 bits to the left. As discussed herein, all 5 of the bits are left shifted in a single operation. The variable shifter 32 then outputs the shifted result to an appropriate register as described above. For synchronization considerations, the clock count may be updated to reflect the variable shift. For instance, if 5 bits are left shifted in a single operation, the clock count may be incremented in parallel by 5.

FIG. 4 is a flowchart illustrating the program flow of a state machine 30 consistent with the invention. Exemplary steps include initialization processes at blocks 100 and 102, where the state machine 30 may reset memory and read the loading modulus. Reading of the modulus at block 102 may include a determination of whether the most significant bit of the modulus is located within the first word and/or within the capacity of a register of the system 10. If so, the state machine 30 may ignore further words of the modulus, if any, and store the first word of the modulus in an appropriate register at block 110.

In either case, the state machine 30 continues to execute processing loops at blocks 106 and 110 until the system clock count equals 2n, per Montgomery modulation specifications. At such time, the state machine 30 may save and output the working register at block 114, the contents of which comprise the error correction parameter.

While the invention has and hereinafter will be described in the context of circuit arrangements and data processing systems utilizing the same, those skilled in the art will appreciate that circuit arrangements consistent with the invention are also capable of being distributed as program products in a variety of forms, and that the invention applies equally regardless of the particular type of signal bearing media used to actually carry out the distribution. Examples of signal bearing media include, but are not limited to recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

Moreover, additional advantages and modifications will readily appear to those skilled in the art. The invention in its broader aspects is therefore not limited to the specific details, representative apparatus and method, and illustrative examples shown and described. Accordingly, departures may be made from such details without departing from the spirit and scope of applicants' general inventive concept. For example, one of skill in the art will appreciate that the functionality of the exemplary circuit 10 may be accomplished programmably with less hardware in accordance with the principles of the present invention. Additionally, one of skill in the art will recognize that circuits consistent with the present inventions may be realized in a number of ways based on the specification and in accordance with the underlying principles of the invention. Therefore, the invention lies in the claims hereinafter appended.

What is claimed is:

1. A method of determining an error correction parameter for use in Montgomery modular processing, comprising: (a) performing a modulo operation on a modulus value by sequentially performing a plurality of shift/compare operations on contents of a working register; and (b) storing an initial value in the working register that is greater than the modulus value.

2. The method of claim 1, further comprising determining the initial value by left shifting the contents of the working register a number of positions correlating to one position past a most significant bit of the modulus value.

3. The method of claim 1, further comprising determining a most significant bit of the modulus value.

4. The method of claim 3, further comprising checking each word of the modulus value for the most significant bit.

5. The method of claim 1, further comprising determining the initial value while the modulus value loads.

6. The method of claim 1, wherein performing the plurality of shift/compare operations further comprises left shifting the working register to determine a shifted result.

7. The method of claim 6, further comprising processing the modulus value and the shifted result using bit-by-bit subtraction to determine a subtracted result.

8. The method of claim 7, further comprising determining a next working value from among a group consisting of the shifted result and the subtracted result by comparing the subtracted result to zero.

9. The method of claim 7, further comprising storing the shifted and subtracted results in separate memories.

10. The method of claim 1, wherein performing the plurality of shift/subtract operations further comprises left shifting the working register a plurality of positions in a single loop iteration.

11. The method of claim 10, further comprising left shifting the working register a number of positions corresponding to a number correlating to a difference between a most significant bit of the working register and a most significant bit of the modulus value.

12. The method of claim 1, further comprising conducting in parallel a shift function and a subtraction function of a shift/compare operation of the plurality of shift/compare operations.

13. A method of determining an error correction parameter used in Montgomery modular processing, comprising: (a) performing a modulo operation by sequentially performing a plurality of shift/compare operations on contents of a working register; and (b) selectively shifting contents of the working register by more than one position in connection with a shift/compare operation.

14. The method of claim 13, wherein selectively shifting further comprises left shifting the working register a number of positions corresponding to a difference between a most significant bit of the working register and a most significant bit of a modulus value.

15. The method of claim 14, wherein the left shifting further comprises determining the most significant bit of the working register.

16. The method of claim 13, further comprising conducting a subtraction function of a shift/compare operation of the plurality of shift/compare operations in parallel with selectively shifting the contents of the working register.

17. A circuit arrangement, comprising: (a) a working register; and (b) an error correction parameter circuit configured to determine an error correction parameter for use in Montgomery modular processing by performing a modulo operation on a modulus value, wherein the error correction parameter circuit is configured to perform the modulo operation by sequentially performing a plurality of shift/compare operations on contents of the working register, wherein the error correction parameter circuit is further configured to store an initial value in the working register that is greater than the modulus value.

18. The circuit arrangement claim 17, wherein the initial value correlates to a working register value of one position past a most significant bit of the modulus value.

19. The circuit arrangement of claim 17, wherein the error correction parameter circuit further comprises a state machine configured to determine a most significant bit of the modulus value.

20. The circuit arrangement of claim 19, wherein the state machine checks each word of the modulus value for the most significant bit.

21. The circuit arrangement of claim 17, wherein the error correction parameter circuit further comprises a variable shifter configured to left shift the working register to produce a shifted result.

22. The circuit arrangement of claim 21, wherein the error correction parameter circuit further comprises a subtraction circuit configured to process the modulus value and the shifted result using bit-by-bit subtraction to determine a subtracted result.

23. The circuit arrangement of claim 22, wherein the error correction parameter circuit further comprises a state machine configured to determine a next working value from among a group consisting of the shifted result and the subtracted result by comparing the subtracted result to zero.

24. The circuit arrangement of claim 22, wherein the error correction parameter circuit further comprises a plurality of registers for separately storing the shifted and subtracted results.

25. The circuit arrangement of claim 17, wherein the error correction parameter circuit further comprises a variable shifter configured to shift the working register a plurality of spaces in a single loop iteration.

26. A program product comprising hardware definition program code defining the circuit arrangement of claim 17, and a signal bearing medium bearing the hardware definition program code, wherein the signal bearing medium comprises at least one of a transmission medium and a recordable medium.

27. The circuit arrangement of claim 17, wherein the plurality of shift/compare operations include a shift function and a subtraction function executed in parallel.

28. A circuit arrangement, comprising: (a) a working register; and (b) an error correction parameter circuit configured to determine an error correction parameter for use in Montgomery modular processing by performing a modulo operation on a modulus value, wherein the error correction parameter circuit is configured to perform the modulo operation by sequentially performing a plurality of shift/compare operations on contents of the working register, wherein the error correction parameter circuit comprises a variable shifter configured to selectively shift contents of the working register by more than one position in connection with a shift/compare operation.

29. The circuit arrangement of claim 28, wherein the variable shifter selectively shifts the contents of the working register a number of positions corresponding to a difference between a most significant bit of the working register and a most significant bit of a modulus value.

30. A program product comprising hardware definition program code defining the circuit arrangement of claim 28, and a signal bearing medium bearing the hardware definition program code, wherein the signal bearing medium comprises at least one of a transmission medium and a recordable medium.

31. The circuit arrangement of claim 28, wherein the plurality of shift/compare operations include a shift function and a subtraction function executed in parallel.

* * * * *